Figure 1:
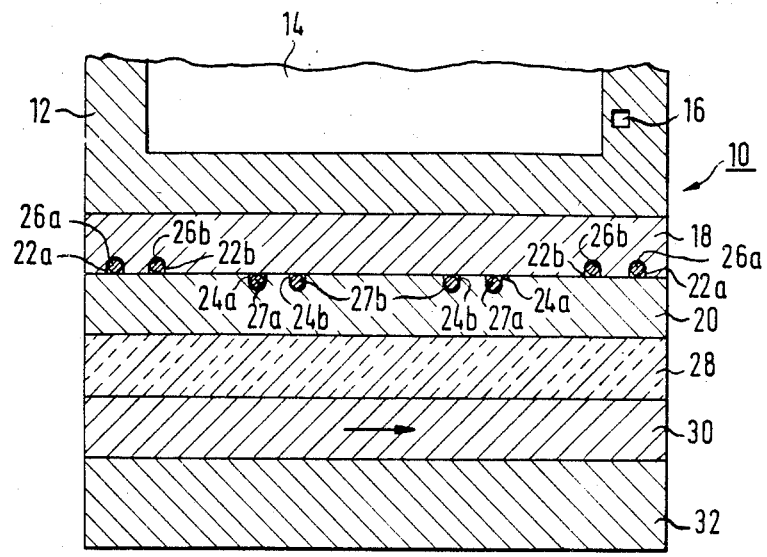

United States Patent [19]

Härtel et al.

[11] Patent Number: 4,586,690
[45] Date of Patent: May 6, 1986

[54] APPARATUS FOR THE MANUFACTURE OF MOLDED PARTS FROM MOLDING COMPOUNDS

[75] Inventors: Volker Härtel, Germering; Josef Rachel, Wolfratshausen, both of Fed. Rep. of Germany

[73] Assignee: Metzeler Kautschuk GmbH, Munich, Fed. Rep. of Germany

[21] Appl. No.: 630,511

[22] Filed: Jul. 13, 1984

[30] Foreign Application Priority Data

Jul. 13, 1983 [DE] Fed. Rep. of Germany ....... 3325310

[51] Int. Cl.$^4$ ............................................. B22D 27/02
[52] U.S. Cl. ...................... 249/78; 219/422; 219/424; 219/441; 249/160; 264/40.1; 264/328.16; 425/144
[58] Field of Search .................... 249/78, 79, 81, 160; 425/144, 407; 338/252; 219/422, 424, 438, 439, 441, 442, 430, 433; 264/40.1, 328.16

[56] References Cited

U.S. PATENT DOCUMENTS

| 2,540,242 | 2/1951 | Brennan | 249/78 |
| 3,751,014 | 8/1973 | Waterloo | 425/144 |
| 3,760,156 | 9/1973 | Kehl et al. | 219/439 |
| 3,849,630 | 11/1974 | Halliday | 338/252 |
| 3,850,559 | 11/1974 | Mintz et al. | 425/144 |
| 4,490,321 | 12/1984 | Klinkaü | 425/407 |

Primary Examiner—Jay H. Woo
Assistant Examiner—James C. Housel
Attorney, Agent, or Firm—Herbert L. Lerner; Laurence A. Greenberg

[57] ABSTRACT

A device for the manufacture of molded parts from molding materials, includes a molding tool being completely closed, having a molding cavity formed therein and being divisible, a heating device having two heating plates disposed on top of each other and fastened to the molding tool, the heating plates being in mutual contact along respective contact surfaces thereof, at least one of the contact surfaces having slots formed therein, and tubular electrical heating elements with metal cladding press-fitted in the slots.

4 Claims, 2 Drawing Figures

APPARATUS FOR THE MANUFACTURE OF MOLDED PARTS FROM MOLDING COMPOUNDS

The invention relates to an apparatus for manufacture of molded parts from molding materials, having a divisible molding tool which is closed all around and has a molding cavity formed therein, and a heating device connected to the molding tool.

The molding tools of such apparatus are generally heated indirectly by electric energy, steam or liquid media, such as oil. For this purpose, drill holes for the passage of steam or heated oil can be provided, for instance, in the base of the molding tool. A disadvantage in this case is that these drill holes must be perfectly sealed; in addition, only straight holes can be used so that it is impossible to match to different heating characteristics, relative to the area to be heated. In particular, it becomes problematical to generate a very exact amount of heat per area unit.

It is furthermore known to insert so-called "heating cartridges" with a close fit in holes which are generally made in the form of blind holes. However, it is relatively common to burn-in such heating cartridges, in which case the replacement of defective heating cartridges is complicated. In addition, only blind holes with a straight course can be used, so that it is impossible to adapt to different heat characteristics.

It is accordingly an object of the invention to provide an apparatus for the manufacture of molded parts from molding compounds, which overcomes the hereinafore-mentioned disadvantages of the heretofore-known devices of this general type.

In particular, an apparatus is to be provided which assures very uniform, exact and reproducible heating of the molding cavity.

With the foregoing and other objects in view there is provided, in accordance with the invention, a device for the manufacture of molded parts from molding materials, comprising a molding tool being completely closed, having a molding cavity formed therein and being divisible or able to be parted, a heating device having two heating plates disposed on top of each other and fastened to the molding tool, the heating plates being in mutual contact along respective contact surfaces thereof, at least one of the contact surfaces having slots formed therein, and tubular electrical heating elements with metal cladding press-fitted in the slots.

The advantages obtained with the invention are based in particular on the provision that electrically heated heating plates are directly attached to the molding tool proper, and that the parting surfaces of the plates have slots formed therein. Tubular heating elements with metal cladding are inserted into these slots. A suitable metal for the elements can be chosen in dependence on the respective permissible tube cladding temperature.

Such tubular heating elements contain a helically-wound resistance element in the metal cladding, which in turn is surrounded by highly compacted magnesium oxide.

In accordance with another feature of the invention, the slots are in the form of an open loop, and the tubular heating elements are bent corresponding to the slots. The shape of the slots can in turn be adapted to the special desired heating characteristics.

The tubular heating elements are disposed in the slots with a tight fit, so that optimum heat transfer between the tubular heating elements and the heating plates is assured. The heating power as installed is determined by the quantity and the length of the tubular heating elements.

In accordance with a further feature of the invention, the slots are formed in both of the contact surfaces. The formation of the slots in both contact surfaces makes it possible to place the tubular heating elements at different distances from the molding tool; thereby, temperature peaks can be broken down and the influence of heat build-ups can be eliminated, so that very uniform temperature conditions as seen over the entire area of the molding tool can be achieved, i.e. only slight temperature variations about an average value are experienced.

Advantageously, the heating power generated in the outer zones of the heating plates per $cm^2$ is increased by placing several tubular heating elements in these regions. In this manner, radiation losses which occur at the edge of the heating plates can be compensated.

For this reason, the tubular heating elements in the outer regions should also be disposed at a smaller distance from the molding tool, i.e. they should be in the contact surface of the upper heating plate.

In the center of the heating plates and therefore of the molding tool, the radiation losses are smaller so that the tubular heating elements can be disposed at a larger distance from the molding tool in this region. It is therefore possible to place the tubular heating elements in the contact surface of the heating plate at a location removed from the molding tool.

In accordance with an added feature of the invention, the slots are in the form of a plurality of substantially concentric loops, the slots formed in the contact surface of the heating plate closest to the molding tool are disposed relatively radially outward and the slots formed in the contact surface of the heating plate furthest from the molding tool are disposed relatively radially inward.

Advantageously, the slots in which the tubular heating elements are disposed, are all open loops, and a separate control circuit is assigned to each tubular heating element, which should be located as close as possible to the molding cavity.

In this way, accurate and reproducible temperatures can be obtained in the molding cavity and therefore, correspondingly uniform vulcanization times are obtained, if such apparatus is used for vulcanizing rubber mixtures.

Radiation losses, heat conduction, mass and size differences no longer influence the heating process.

In accordance with an additional feature of the invention, the outward tubular heating elements are interconnected in parallel, the inner tubular heating elements are interconnected in parallel, and including two control circuits each being connected to a respective one of the inner and outer heating elements. This is done so that it becomes possible to control these tubular heating elements independently of each other.

In accordance with a concomitant feature of the invention, there are provided two temperature sensors each being connected to a respective one of the control circuits and each being disposed in vicinity of the molding cavity.

In addition, the tubular heating elements can be connected in steps as a function of the temperature, in order to make the heating-up time as short as possible and to keep the energy consumption low, because the full heating power can now be used upon starting and losses can be compensated by means of a low base load.

A further advantage is the simple and inexpensive fabrication of the heating plates which no longer need holes with a close fit; furthermore, inexpensive standard heating elements which can be easily obtained in different shapes are used. For example, tubular heating elements with metal cladding can be used, with a shape that can be easily adapted to the desired temperature characteristic. The servicing of these heating devices also presents no problems, since the tubular heating elements can be removed from the open slots without encountering trouble and can be replaced if desired.

By suitably laying out the slots and the quantity and length of the tubular heating elements, the heating device can be adapted to any desired order of magnitude of the molding cavity and/or heating power, so that this device can be employed in vulcanizing presses as well as in other molding devices.

Other features which are considered as characteristic for the invention are set forth in the appended claims.

Although the invention is illustrated and described herein as embodied in an apparatus for the manufacture of molded parts from molding compounds, it is nevertheless not intended to be limited to the details shown, since various modifications and structural changes may be made therein without departing from the spirit of the invention and within the scope and range of equivalents of the claims.

Figure 2:
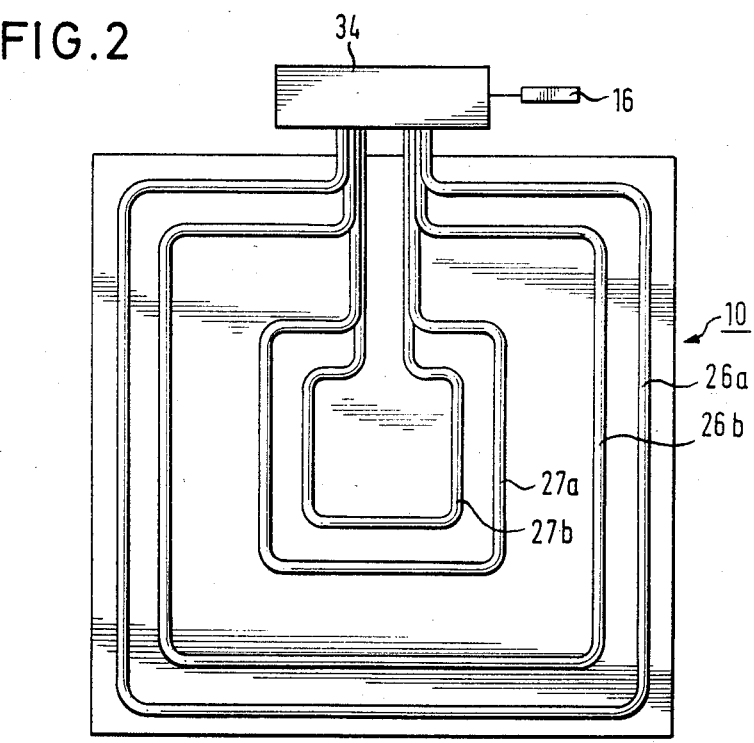

The construction and method of operating of the invention, however, together with additional objects and advantages thereof will be best understood from the following description of specific embodiments when read in connection with the accompanying drawings, in which:

FIG. 1 is a fragmentary, diagrammatic, cross-sectional view of the important parts of a device for manufacturing molded or shaped parts from molding compounds or batches; and FIG. 2 is a top-plan view of the heating device with certain portions removed.

Referring now to the figures of the drawings in detail and first particularly to FIG. 1 thereof, there is seen a device for the manufacture of molded parts of molding compounds indicated generally by reference symbol 10. The device 10 includes a press base plate 32, a push-out plate 30, an insulating plate 28, two heating plates 20 and 18, as well as a molding tool 12 proper having a molding cavity 14 formed therein. The molding tool 12 can be parted along a nonillustrated parting line, so that it can be opened and the finished molded part can be removed.

The two heating plates 18 and 20 are firmly connected to the molding tool 12 by non-illustrated screws and the heating plates 18, 20 have slots formed in the contact surfaces thereof which face each other. More specifically, slots 22a, 22b are formed in the contact plane of the upper heating plate 18 which is closest to or facing the molding tool 12 and slots 24a, 24b are formed in the contact surface of the lower heating plate 20.

Tubular electrical heating elements 26a, 26b, 27a, 27b with metal cladding are disposed in the slots 22a, 22b, 24a, 24b in a tight fit in order to assure good heat transfer from the tubular heating elements to the corresponding heating plates 18, 20.

As can be seen in FIG. 2, the slots 22a, 22b, 24a, 24b and accordingly the tubular heating elements 26a, 26b, 27a, 27b as well, have the shape of approximately rectangular loops which are disposed concentrically to each other; the outer slots 22a, 22b and the corresponding tubular heating elements 26a, 26b are located in the contact surface of the upper heating plate 18 facing or closest to the molding tool 12, in order to compensate for radiation losses from the outer surfaces of the heating plates or the molding tool. The inner slots 24a, 24b and the corresponding associated tubular heating elements 27a, 27b are located in the contact surface of the lower heating plate 20 since in this area, the radiation losses are smaller and therefore the use of a small distance between the heat source and the molding tool 12 is not necessary.

The heating power when installed is determined by the quantity and length of the tubular heating elements, while an accurately defined uniform temperature over the entire surface of the molding cavity 14 can be provided by the spatial arrangemrnt of the slots and the associated tubular heating elements.

A temperature sensor 16 is disposed in the molding tool 12 at a spacing which is as small as possible from the molding cavity 14. The temperature sensor 16 is connected to a control circuit 34 for the tubular heating elements 26a, 26b, 27a, 27b.

As an alternative to the illustrated embodiment, a separate control circuit with an associated temperature sensor 16 can also be provided in the molding tool 12 for each tubular heating element. In this case, the outer tubular heating elements on one side and the inner tubular heating elements on the other side, should be connected in parallel to form a control circuit of their own.

It is also possible to connect the tubular heating elements 26a, 26b, 27a, 27b in steps as a function of the temperature, in order to make the heating-up time as short as possible and to optimize energy consumption; the device can then be operated with full heating power during starting, and the losses occuring then can be compensated by the relatively low base load.

We claim:

1. Device for the manufacture of molded parts from molding materials, comprising a molding tool having a molding cavity formed therein and being divisible, a heating device having two heating plates disposed one on top of the other and fastened to said molding tool, said heating plates being in mutual contact along respective contact surfaces thereof, said contact surfaces having slots formed therein in the form of a plurality of substantially concentric loops, said slots formed in said contact surface of said heating plate closest to said molding tool being disposed radially outward of said slots formed in said contact surface of said heating plate furthest from said molding tool, and tubular electrical heating elements with metal cladding press-fitted in said slots.

2. Device according to claim 1, wherein said slots are in the form of an open loop, and said tubular heating elements are bent corresponding to said slots.

3. Device according to claim 1, wherein said tubular heating elements in said slots of said heating plate closest said molding tool are interconnected in parallel, said tubular heating elements in said slots of said heating plate furthest from said molding tool are interconnected in parallel, and including two control circuits each being connected to a respective one of said heating elements in said slots of said heating plates.

4. Device according to claim 3, including two temperature sensors each being connected to a respective one of said control circuits and each being disposed in the vicinity of said molding cavity.

* * * * *